United States Patent
Lawrence et al.

(10) Patent No.: US 6,505,106 B1
(45) Date of Patent: Jan. 7, 2003

(54) ANALYSIS AND PROFILING OF VEHICLE FLEET DATA

(75) Inventors: Kelvin Roderick Lawrence, Round Rock, TX (US); Jay A. Tunkel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/306,196

(22) Filed: May 6, 1999

(51) Int. Cl.$^7$ .......................... G06F 15/21; G06F 19/00; G06F 165/00
(52) U.S. Cl. ........................ 701/35; 701/29; 342/357.01
(58) Field of Search .............................. 701/29, 30, 32, 701/35, 207, 202, 210, 209, 213; 340/988; 342/357.01, 357.06, 357.07, 357.08, 357.12, 357.13

(56) References Cited

U.S. PATENT DOCUMENTS

| | | | | |
|---|---|---|---|---|
| 4,926,331 A | * | 5/1990 | Windle et al. | 364/424.04 |
| 5,539,645 A | * | 7/1996 | Mandhyan et al. | 364/438 |
| 5,550,738 A | * | 8/1996 | Bailey et al. | 364/424.04 |
| 5,586,130 A | * | 12/1996 | Doyle | 371/62 |
| 5,638,077 A | * | 6/1997 | Martin | 342/357 |
| 5,650,930 A | * | 7/1997 | Hagenbuch | 364/421.07 |
| 5,680,328 A | * | 10/1997 | Skorupski et al. | 364/550 |
| 5,719,771 A | * | 2/1998 | Buck et al. | 364/443 |
| 5,742,915 A | * | 4/1998 | Stafford | 701/35 |
| 5,751,245 A | * | 5/1998 | Janky et al. | 342/357 |
| 5,794,164 A | * | 8/1998 | Beckert et al. | 701/1 |
| 5,819,201 A | * | 10/1998 | Degraaf | 701/208 |
| 5,844,473 A | | 12/1998 | Kaman | 340/439 |
| 5,867,404 A | * | 2/1999 | Bryan | 364/550 |
| 5,917,405 A | * | 6/1999 | Joao | 340/426 |
| 5,999,878 A | * | 12/1999 | Hanson et al. | 701/208 |
| 6,026,345 A | * | 2/2000 | Shah et al. | 701/117 |
| 6,240,365 B1 | * | 5/2001 | Bunn | 701/213 |

* cited by examiner

Primary Examiner—Tan Nguyen
Assistant Examiner—Dalena Tran
(74) Attorney, Agent, or Firm—Duke W. Yee; Jeffrey S. LaBaw; Stephen R. Tkacs (57) ABSTRACT

Data records transmitted from a plurality of vehicles are collected at a central data repository, where realtime or batch analysis and profiling can take place to facilitate vehicle fleet maintenance. Preferably, each data record includes data derived by synchronizing on-board diagnostic computer output and GPS 3-dimensional location data, correlated by time and tagged with vehicle identification information, and is forwarded to the central data repository via cellular Internet. The central data repository includes analysis and profiling routines to identify immediate operational problems on a given vehicle, e.g., engine overheating, as well as overall fleet operational behavior, i.e. which vehicles, drivers and routes lead, over time, to increased maintenance costs. As data is collected over time, the experience database becomes more and more valuable and enables the fleet manager to improve its fleet operational decisions, such as route scheduling, maintenance scheduling, vehicle purchasing, driver assignments, and the like.

16 Claims, 4 Drawing Sheets

| VEHICLE ID | DIAGNOSTIC DATA | GEOGRAPHIC POSITION DATA | TIMESTAMP |
|---|---|---|---|
| VIN1234RJP23 | . . . . . . | . . . . . . | XX:XX:XX |

| VEHICLE ID | DIAGNOSTIC DATA | GEOGRAPHIC POSITION DATA | TIMESTAMP |
|---|---|---|---|
| VIN1234RJP23 | · · · · · · · | · · · · · · · | XX:XX:XX |

ANALYSIS AND PROFILING OF VEHICLE FLEET DATA

BACKGROUND OF THE INVENTION

1. Technical Field

The present invention relates generally to monitoring vehicle operating conditions and, in particular, to techniques for collecting and correlating vehicle diagnostic and geographic position data to facilitate the building of a central data repository for use in analyzing how vehicle routing correlates, e.g., with engine data and maintenance history.

2. Description of the Related Art

Enterprises that run and maintain large vehicle fleets have ongoing problems with efficient maintenance. An effective maintenance program typically is dependent upon reliable monitoring of vehicle use and accurate collection of use data. As the size of the fleet increases, data monitoring and collection becomes more problematic, especially if different operators are assigned the responsibility for driving the same vehicle. Indeed, the problem is exacerbated when vehicle demand is high.

There have been attempts to address this problem in the prior art, none of which have proven satisfactory. For example, it is known in the prior art to collect operational information from a set of vehicles and to transmit such information to a central location for maintenance purposes. In U.S. Pat. No. 5,844,473 to Kaman, each provisioned vehicle includes a data collection unit having a transceiver for transmitting vehicular information from the collection unit to a central data collection computer through a cellular system. The data collection unit also includes a safety inspection button that is activated by the operator to indicate that the operator has inspected the vehicle for safety defects and certified to the operability of the vehicle. The vehicle may also include a global positioning system (GPS) to enable the central computer to locate the vehicle. In operation, the central computer polls a given vehicle, which then returns accumulated use information together with the safety inspections data. The central computer correlates information on a number of vehicles and provides basic maintenance recommendations.

The data collection techniques described in the Kaman patent are not satisfactory. The central computer must identify a particular vehicle and then issue specific commands to that vehicle. Moreover, the system does not take into consideration that different operators may be driving the same vehicle at different times, under different operating conditions, and over different routes. Thus, the basic maintenance recommendations generated by the central computer are not route- or operator-specific. As a result, a given maintenance operation on a particular vehicle may not be well directed. The overall goal of maintaining the vehicle fleet as a whole may likewise suffer as a result.

Vehicle-centric maintenance systems are also known in the art. One such representative technique is described in U.S. Pat. No. 5,819,201 to DeGraaf. This patent describes an in-vehicle navigation system that includes a CPU, GPS, a display for displaying vehicle service reminders, and an input device to permit the driver to define service intervals. The GPS continuously inputs date and time data into a CPU, which compares that data to the user-defined vehicle service intervals. When the time or distance have exceeded the intervals, the CPU generates a vehicle service reminder on the display. The driver can then request the navigation system to guide the driver to an appropriate vehicle service location. The DeGraaf system, however, is not intended to interface with a central collection computer and, thus, it is not a useful solution for maintaining a fleet of vehicles.

The present invention addresses this problem.

BRIEF SUMMARY OF THE INVENTION

Data records transmitted from a plurality of vehicles are collected at a central data repository, where realtime or batch analysis and profiling can take place to facilitate vehicle fleet maintenance. Preferably, each data record includes data derived by synchronizing on-board diagnostic computer output and GPS 3-dimensional location data, correlated by time and tagged with vehicle identification information. At each vehicle, this data is preferably converted to a suitable format (e.g., Extensible Markup Language (XML)) and forwarded to the central data repository via cellular Internet.

The central data repository includes analysis and profiling routines to identify immediate operational problems on a given vehicle, e.g., engine overheating, as well as overall fleet operational behavior, i.e. which vehicles, drivers and routes lead, over time, to increased maintenance costs. The analysis routine, for example, may identify those routes that lead to increased maintenance expenses, and it may identify which vehicles exhibit out-of-specification operation or which routes tend to force out-of-specification operation and with what frequency. The profiling routine correlates operators with vehicle performance and routing, for example, to identify those combinations of drivers and routes that produce maintenance problems. As data is collected over time, the experience database becomes more and more valuable and enables the fleet manager to improve its fleet operational decisions, such as route scheduling, maintenance scheduling, vehicle purchasing, driver assignments, and the like.

It is thus a primary object of the present invention to provide a method whereby vehicle and engine diagnostic data along with geographic position data are combined, synchronized, and forwarded to a data repository. The information may then by analyzed and correlated to provide maintenance history along with vehicle routing in an integrated manner. Analysis and profiling of fleet data may thereby be effected.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
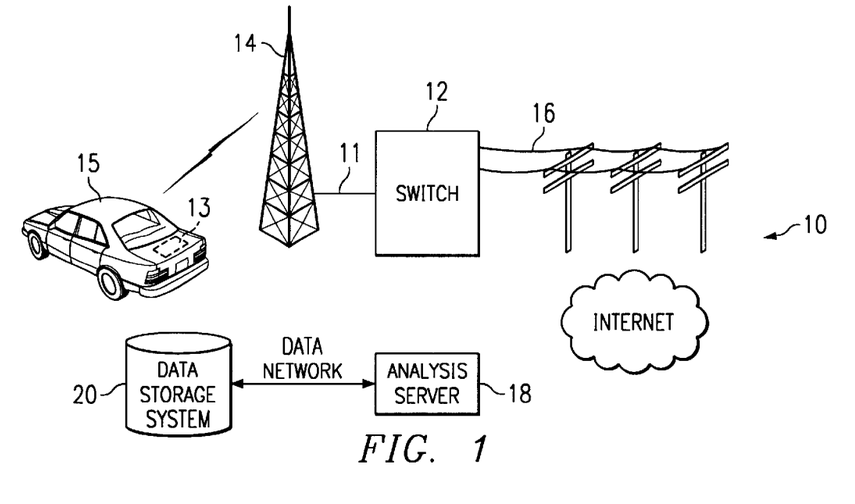
FIG. 1 is a simplified diagram of a vehicle diagnostic and position data collection and communication system according to the present invention.

FIG. 1 illustrates a representative network in which the present invention may be implemented. An exemplary network is a cellular network 10 having a mobile exchange switch 12 connected to a transceiver and an antenna 14. The transceiver is located in each cell of the cellular network and communicates with the switch 12 to effect transmission and reception of signals to and from a data collection system 13 located in a vehicle 15. The transceiver typically is connected to the switch 12 via a dedicated network line 11. The switch 12 typically is connected to a land-based destination via telephone network 16. The in-vehicle data collection system 13 includes a cellular transceiver for transmitting information to a host 18. As will be described, host 18 includes a data repository 20 for storing data collected from a plurality or fleet of vehicles 15. That information is then available for analysis and profiling to facilitate fleet maintenance.

Either the switch 12 or the telephone network 16 is connectable to the Internet or some other computer network. Thus, network 10 provides cellular Internet connectivity between each vehicle 15 and the host 18 in a known manner.

Figure 2:
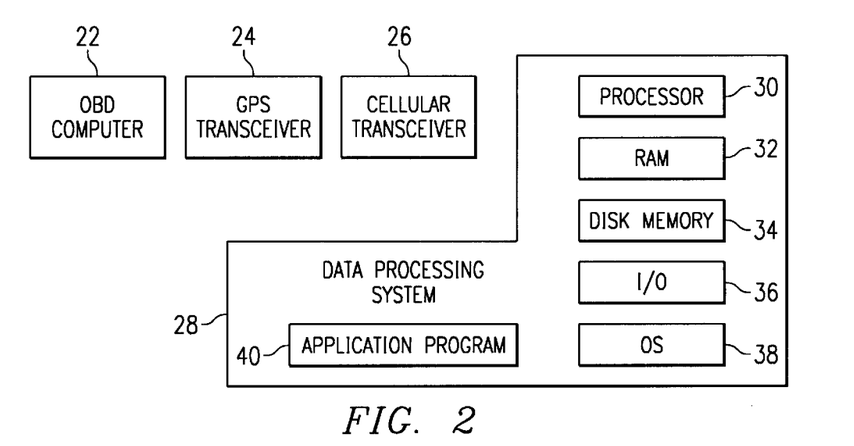
FIG. 2 is a block diagram of the major functional components of the in-vehicle data collection system.

FIG. 2 is a block diagram of the major functional components of the in-vehicle data collection system. The system includes an onboard diagnostic computer 22, a global position system transceiver 24, a cellular transceiver 26, and a data processing system 28. The diagnostic computer 22 is a known system incorporated on many late model (1996 or later) vehicles. The diagnostic computer 22 analyzes performance of the vehicle's engine, transmission and fuel systems, as well as other systems.

Preferably, the diagnostic computer 22 is fully compliant with the OBD-II standard. Further information on the OBD-II standard can be found in SAE Document No. J2205 "Expanded Diagnostic Protocol for OBD-I Scan Tools," available from www.sae.org. For older vehicles, the computer is compliant with earlier versions of this diagnostic standard. Of course, any mechanism that gathers engine and/or vehicle data and reports it externally to the vehicle may be used.

The global position system transceiver 24 is also a commercially available device. As is well-known, GPS is currently the most precise positioning system generally available to the general public. The GPS comprises a network of 24 satellites orbiting the earth. Each satellite transmits a ranging signal modulated on a 1.575 Ghz carrier. By monitoring the signal from a plurality of satellites, GPS transceiver 24 can determine the vehicle's position, i.e. latitude, longitude and altitude, to an accuracy of about 100 meters. Differential GPS, also known in the art and available to the public, is more accurate than standard GPS, but requires an additional land-based transmitter and certain regulatory approvals for its use. Differential GPS may be used in the invention as well.

The cellular transceiver 26 transmits data over the cellular Internet connection to the host 18 in a known manner. The data processing system may include a processor 30, system memory (RAM) 32, disk memory 34, input/output devices 36, and an operating system 38. The inventive functionality preferably is provided by application program 40 as will be described.

Although not meant to be limiting, data processing system may be a so-called pervasive computing client. In particular, recently the computer industry has sought to add computer processing and communications capabilities to devices other than what would normally be considered a traditional computer. Such devices are quite varied and include, for example, personal digital assistants (PDAs), business organizers (e.g., IBM® Workpad® and the 3Com® PalmPilot®), smartphones, cellular phones, other handheld devices, and the like. For convenience, these devices, as a class, are sometimes referred to as "pervasive computing" clients as they are devices that are designed to be connected to servers in a computer network and used for computing purposes regardless of their location.

A representative pervasive client used as the data processing system for the vehicle is an 86-, PowerPC®- or RISC-based, includes a realtime operating system such as WindRiver VXWorks™, QSSL QNXNeutrino™, or Microsoft Windows CE, a virtual machine, and a rendering engine (e.g., a viewer or browser). One of ordinary skill will appreciate that the data processing system 28 need not be a standalone device. It may comprise part of the onboard diagnostic computer or the GPS system. Thus, FIG. 2 is merely illustrative of the main functional components.

Figure 3:
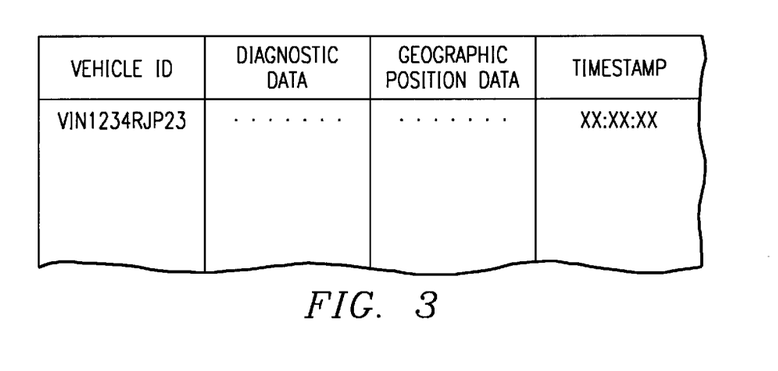
FIG. 3 is a representation of an data record generated by the data collection routine of the present invention.

According to the present invention, a vehicle's position or route is correlated with diagnostic data, preferably over a given time period, to facilitate targeted maintenance of the vehicle. Under the control of the application program 40, vehicle data as reported by an onboard diagnostic computer 22 is correlated with geographic and routing data as reported by an onboard global position system (GPS) transceiver 24, to generate a data record (or a set of data records). A representative data record is illustrated in FIG. 3. This information is then processed and made available to the host for analysis and profiling. The diagnostic data may identify engine rpm, speed, emissions and general engine stress, as well as other information useful is identifying wear and tear on the vehicle and the engine, the transmission, the fuel system, or other vehicle systems or subsystems. Preferably, data records are converted onboard to an appropriate format (e.g., an Extensible Markup Language (XML grammar)), timestamped, validated against preset operational limits (e.g., out-of-spec indicators), and then forwarded via cellular Internet to the host 18. This functionality is provided by the application program 40, which is now described.

Figure 4:
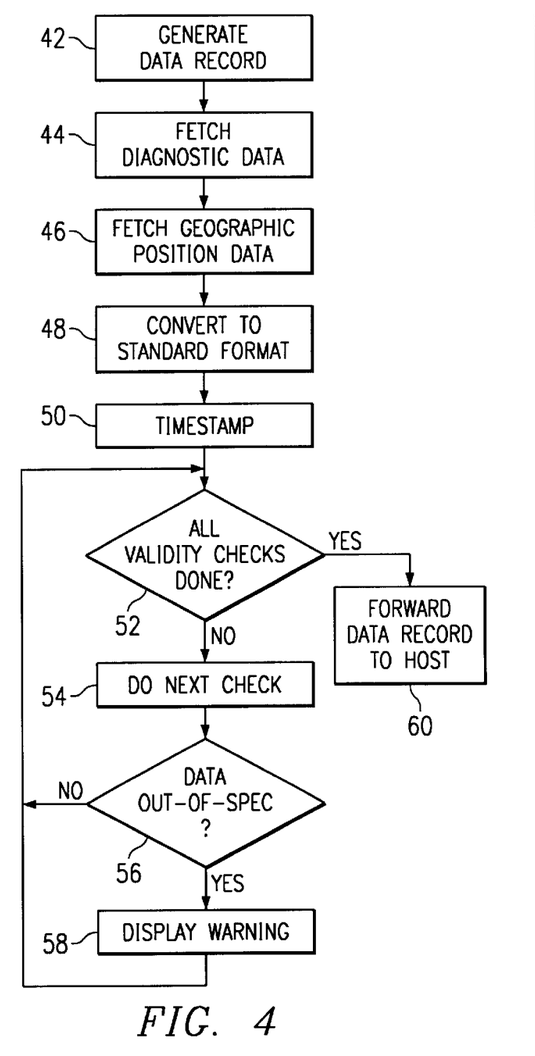
FIG. 4 is a flowchart illustrating a data collection routine operative within a given vehicle.

With reference now to FIG. 4, the application program may be started upon a given event or operate in a continuous loop, waiting for input activity. At step 42, routine begins the generation of a data record. The routine then continues at step 44 to fetch diagnostic data from the onboard diagnostic computer. At step 46, the routine fetches geographic position data for the vehicle from the GPS system. At step 48, the diagnostic data and the geographic position data is converted into a format suitable for communication to the host. Thus, for example, in a cellular Internet implementation, the data is formatted according to an Extensible Markup Language (XML grammar). Preferably, the data is converted using an XML parser, which is a known function. The converted data is then time-stamped at step 50.

The routine then continues to validate the diagnostic data (or portions thereof) against one or more preset operational limits. In particular, at step 52, the routine tests to determine whether all validity checks have been completed. If not, the routine continues at step 54 to perform a next validity check. A test is then run at step 56 to determine whether the data is out of specification. If not, control returns to step 52. If the data is out of specification, the routine branches to step 58 to display a realtime warning indication to the vehicle operator using local display resources (e.g., the data processing system 28 or conventional vehicle displays). The warning may be an audible or visual alarm, or both. Control then returns to step 52. When the outcome of the test at step 52 indicates that all validity checks have been completed, the routine continues at step 60 to forward the data record to the host 18. This completes the processing of a given data record.

One of ordinary skill will appreciate that the sequence of steps in FIG. 4 is merely illustrative. Thus, for example, it is not required that validity checks be performed on each data record (or at all), and the diagnostic data may be validated before being stored with the geographic data. Moreover, it is not required that the data be converted to any given format (e.g., XML) before being transmitted to the host. If formatting is desired, other markup language formats (or other data formats) may be used besides XML. Of course, the diagnostic and position data need not be fetched in any particular order, and it is not required that these individual data components be fetched before storage in the data record; alternatively, each data component may be separately stored in the data record as it is fetched.

The data record preferably is generated on a periodic basis (e.g., every second). Of course, the data record may be generated at any periodic interval, although typically a longer period between the generation of a set of records is less desirable. The frequency of generating data records typically will depend on the amount of computing resources and the storage capability of the data processing system.

Correlating diagnostic and position data in the manner described above is quite advantageous. The data record is a history or snapshot of how the vehicle is operating at a given point in time along a given route. Maintenance recommendations derived from such information are far more robust (as compared to prior art techniques) because they take into consideration how the vehicle is actually operated under given terrain conditions. Thus, for example, data records derived from use of a vehicle in rigorous, hilly terrain are quite likely to show more wear and tear on the vehicle than might otherwise be the case if the vehicle were merely used for medium range driving within a city. Alternatively, the given data records may show that different drivers place differing degrees of wear on the same vehicle even over the same routes. Analysis of such data can identify which routes lead to increased maintenance expenses, which vehicles exhibit out of specification performance, which routes tend to force out of specification operation and with what frequency, which drivers or which route/driver combinations stress the vehicle, and the like. Such analysis is provided by the host, as will now be described.

Figure 5:
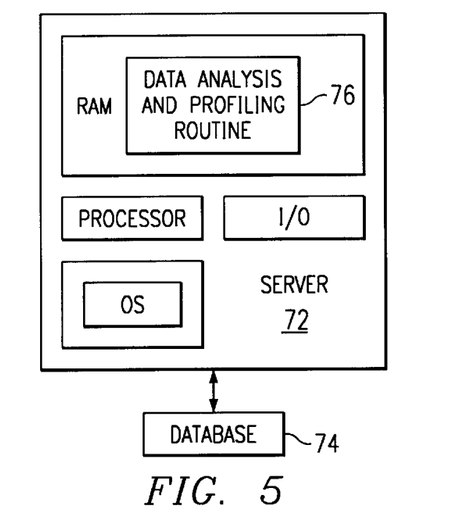
FIG. 5 is a block diagram of the major functional components of the central data repository.

FIG. 5 illustrates the main functional components of the host. Preferably, the host is a generally purpose computer system, e.g., a set of one or more servers. A representative server is a personal computer or workstation that includes a processor, an operating system (e.g., AIX, UNIX, LINUX, Windows '95, Windows NT, or the like), disk storage, system memory, and associated input/output devices. As illustrated in the drawing, server 72 has an associated database 74 for storing the data records forwarded from a plurality of vehicles. Preferably, individual data records for a given vehicle are indexed in the database, together with vehicle identification information, operator information, timestamp information, and the like. The particular storage scheme is not limited to any particular approach, although it may be desired to use an LDAP directory server having a relational database backing store. LDAP is a well-known directory service for Internet applications.

Server 72 also includes or has associated therewith a data analysis and profiling routine 76. The data analysis and profiling routine receives realtime inputs (namely, data records including correlated diagnostic and position data, preferably in a timestamped format) from a plurality of vehicles in the fleet. The analysis and profiling routine identifies immediate operational problems, e.g., such as a given vehicle engine running out of specification, as well as overall fleet operational behavior. As noted above, analysis of this data allows the fleet manager to identify which vehicles, drivers and routes lead, over time, to increased maintenance costs.

According to the present invention, one or more maintenance problems are identified by an analysis of the correlated diagnostic/position data received at the server. Thus, for example, an identified problem is a vehicle route that tends to increase maintenance costs over time. The identified problem may be a vehicle-driver combination that tends to increase maintenance costs over time. Based on the identified problem, the fleet manager may then schedule preventive maintenance according to the vehicle routes that tend to increase maintenance costs.

Figure 6:
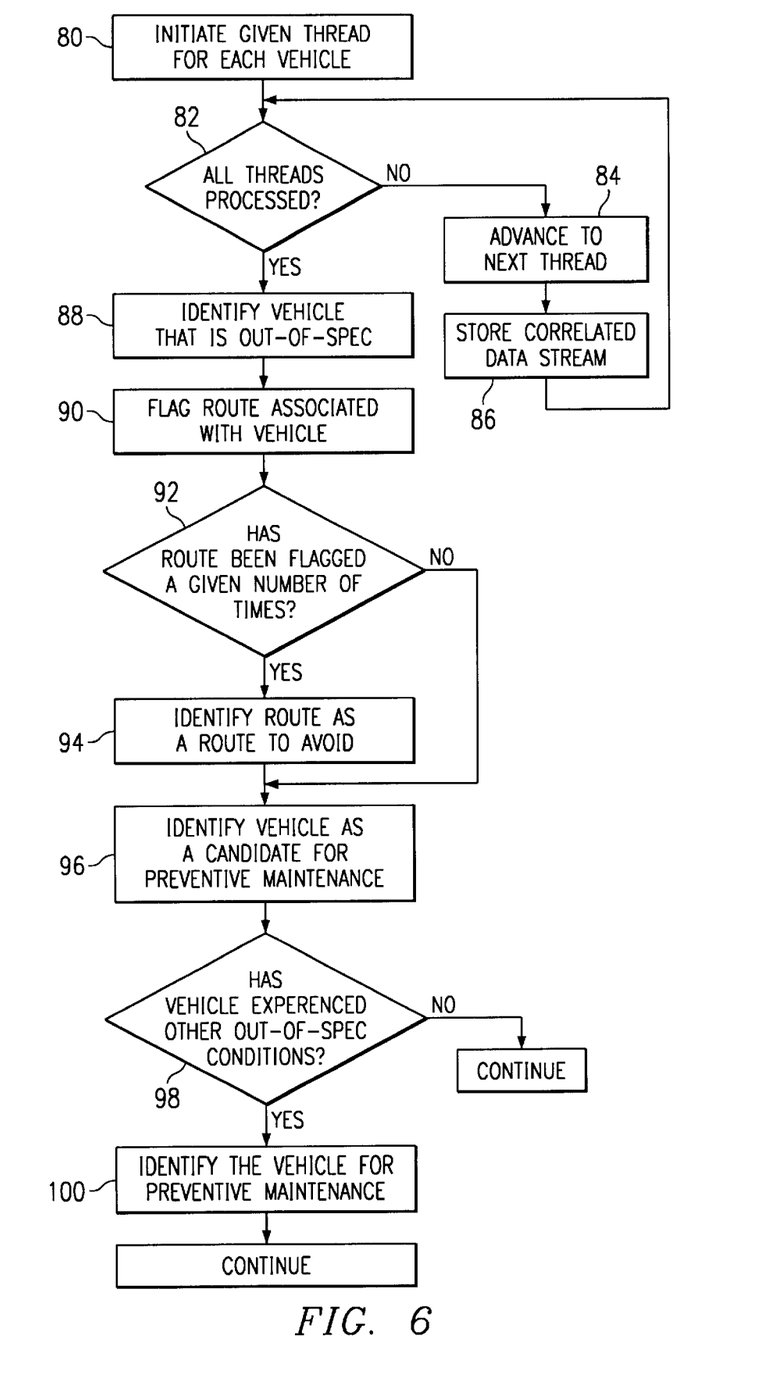
FIG. 6 is a flowchart of a portion of a data analysis and profiling routine implemented at the data repository.

FIG. 6 illustrates a representative implementation of the data analysis and profiling routine. The routine begins at step 80 to initiate a given thread for each vehicle that provides data records over the network. In the preferred embodiment, vehicles provide transmissions automatically, although a given vehicle may be interrogated by the server before transmitting data. In either case, the routine continues at step 82 to test whether all threads have been processed during a given interval. If not, the routine advances to a next thread at step 84. When a correlated data stream associated with that thread is received, the stream is stored at step 86. The routine then returns to step 82. When all threads have been processed, the outcome of the test at step 82 is positive, and the routine branches to step 88.

At this step, the routine identifies any vehicle having a given out of specification condition. Step 88 typically involves an iterative loop that tests for any number of such conditions. At step 90, the route associated with the condition identified in step 88 is flagged. Step 90 is typically executed in an iterative fashion until all conditions are tested. At step 92, the routine tests whether the route flagged at step 90 has been flagged more than a given number of times. If so, the routine continues at step 94 to identify the route as a route to be avoided. At step 96, the routine identifies the vehicle having the out of specification condition as a candidate for preventive maintenance. A test is then run at step at step 98 to determine whether the vehicle has experienced other out of specification conditions during a given time interval. If so, the routine identifies the vehicle for preventive maintenance at step 100.

Although not illustrated in detail, one of ordinary skill will appreciate that similar process threads and routines are executed by the data analysis and profiling routine to generate additional maintenance recommendations and actions.

The above-described techniques provided numerous advantages. By using realtime data derived from the OBD II and GPS systems, the present invention takes advantage of existing vehicle functionalities. This information is then easily correlated and used to analyze vehicle behavior and route characteristics as a function of maintenance experience. By collecting data records over time and from a plurality of vehicles, the fleet manager constructs a dynamic experience database of this data to facilitate more intelligent fleet operational decisions e.g., route scheduling, maintenance scheduling, vehicle purchasing, and the like. Moreover, because the data records are preferably stored in a common Internet format (e.g., an XML grammar), the present invention allows for easy transmission and interchange of this data across a variety of data processing systems.

As noted above, collection of the correlated data from a plurality of provisioned vehicles enable the fleet manager to generate a valuable experience database. This correlated data (engine operational data, vehicle position data, vehicle identification data, and time) for a fleet of vehicles is then collected at the server, where realtime continual analysis and later batch data analysis can take place. As described, this analysis can identify immediate operational problems such as engine running out of spec (e.g., overheating) and overall fleet operational behavior (which vehicles, drivers, and routes lead, over time, to increased maintenance costs). Analysis of this data then leads to reduced fleet operational expenses due to:

Identification of which routes lead to increase maintenance expenses (route modification or avoidance)

Identification of which vehicles exhibit out of spec operation or which routes tend to force out of spec operation and with what frequency (more frequent preventive maintenance can be scheduled)

Analysis and correlation of drivers with vehicle performance and routing (which combinations to avoid). Over time, this operational database is then used to influence not only maintenance schedules, but also drive decisions on vehicle purchases as appropriate to routes driven.

Correlation of engine data, as reported by the onboard diagnostic computer (OBD II), which relates to rpm, speed, emissions and general stress, with geographical and routing data, as reported by the onboard GPS receiver, provides insights into the proper maintenance and routing of a vehicle fleet. This information when applied over time is used to schedule preventive maintenance, change routes and schedules, or otherwise optimize fleet logistics to control the overall cost of operating the vehicle fleet.

In a preferred embodiment as has been described, the data is derived from onboard diagnostic computer (OBD II) output and GPS 3-dimensional location data, correlated by time and tagged with a vehicle identifier. This correlation technique is not meant to be taken by way of limitation. Thus, for example, the position data may be correlated with any diagnostic data, regardless of whether that data is compiled by an OBD-compliant device. Thus, the diagnostic data may be collected through any convenient device, e.g., a tachometer, a fuel gauge, etc. Moreover, information obtained from other sources may be used to augment the OBD-II diagnostic data.

Figure 7:
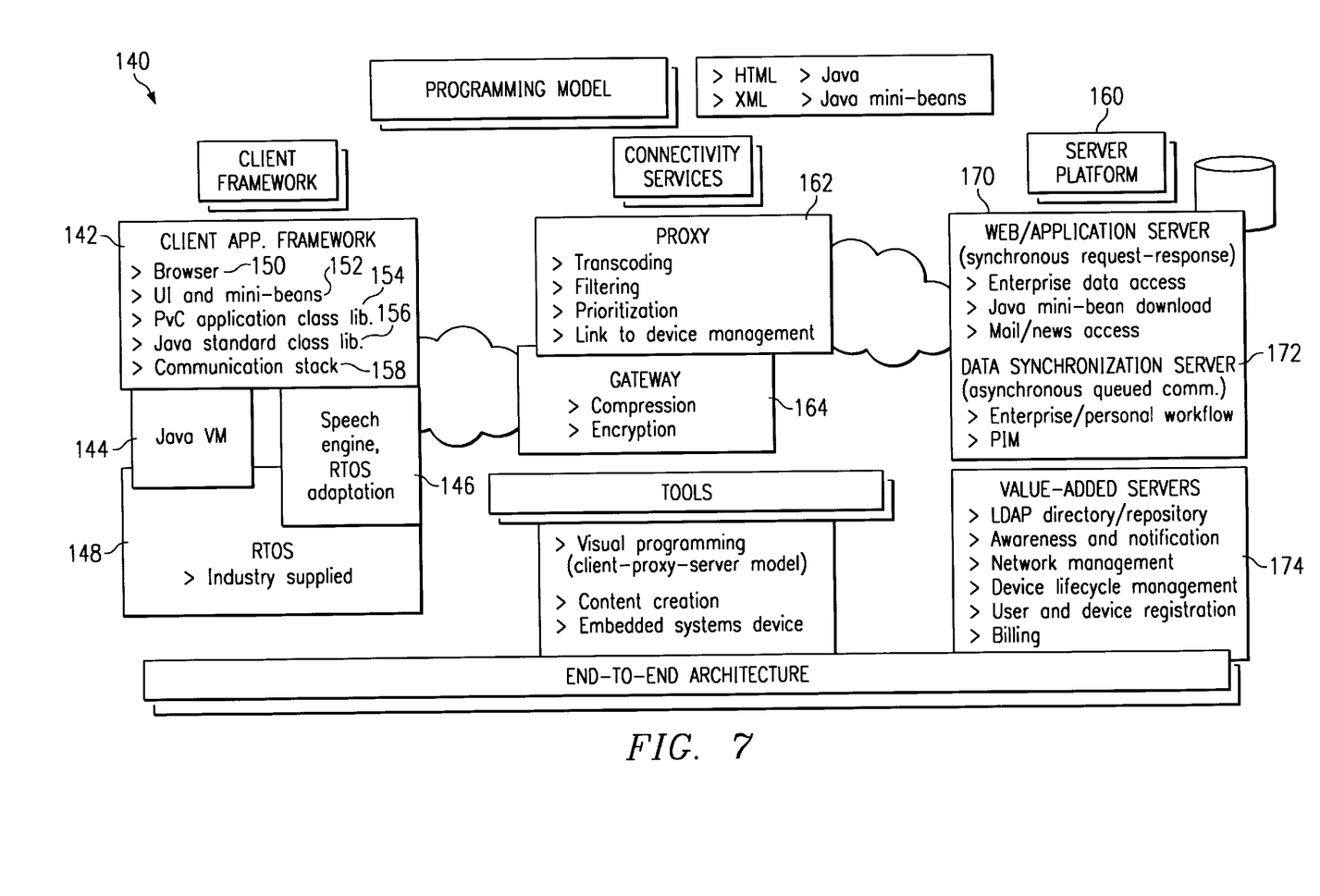
FIG. 7 is a detailed client-server architecture for use in implementing the present invention.

By way of additional background, FIG. 7 illustrates a client-server architecture in which the present invention may be implemented. The client corresponds to the data processing system in the vehicle, and the server corresponds to the platform on which the data analysis and profiling routine is executed. Referring now to FIG. 7, a representative pervasive computing device comprises client stack 140 including a number of components, for example, a client application framework 142, a virtual machine 144, a speech engine 146, and an industry-supplied runtime operating system (RTOS) 148. The client application framework 142 typically includes a browser 150, a user interface 152, a pervasive computing client application class library 154, a standard Java class library 156, and a communication stack 158. The pervasive computing client connects to a server platform 160 via a connectivity service 162.

At its lower level, the connectivity service 62 includes a gateway 164 that provides compression and encryption functions. The gateway implements a network security protocol that has been extended according to the method of the present invention. The upper level of the connectivity service 162 is the proxy 166 that provides one or more different functions such as: transcoding, filtering, prioritization and link to device management.

The server platform 160 may be of several different types. The platform 160 may be a Web/application server 170 (a synchronous request-response type server) or a data synchronization server 172 174 (an asynchronous queued communication type server). The basic functions are each such server type are illustrated. Alternatively, the platform 160 may be a value-added server that provides additional services such as LDAP directory/repository, awareness and notification, network management, device life cycle management, user and device registration, or billing.

The inventive control routines may be implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, a vehicle is any mobile entity, not just an automobile or truck, that has the capability of monitoring diagnostic data and correlating such data with position data. Thus, the principles of the present invention are applicable to other types of vehicles, such as self-propelled devices, boats, airplanes and the like.

Moreover, the above-described techniques are not limited to use for vehicle maintenance. The server database also provides a historical record of vehicle, route and driver operational information that may be used for other purposes.

Having thus described our invention, what we claim as new and desire to secure by letters patent is set forth in the following claims.

What is claimed is:

1. A method in a data processing system for analysis of data generated by a plurality of vehicles in a fleet, wherein each of the vehicles is equipped with an onboard diagnostic device and a global positioning system, comprising the steps of:

receiving multiple streams of correlated data, each stream from one of the plurality of vehicles and containing correlated diagnostic and position data in a time stamped format;

analyzing the correlated diagnostic and position data over time to identify a given maintenance problem, wherein the identified maintenance problem is at least one of a vehicle route, a given driver, and a vehicle route-driver combination that, for a given vehicle, results in increased maintenance costs for the vehicle over a given time period; and taking an action to resolve the identified maintenance problem, wherein the action comprises at least one of assigning a given vehicle an alternate route to avoid the vehicle route, assigning a new driver to the given vehicle to avoid the vehicle-driver combination, and scheduling preventive maintenance for vehicles that use the vehicle route.

2. The method as recited in claim 1, wherein the correlated data is analyzed over a given time period to identify given vehicles in the fleet that exhibit out of specification operation.

3. The method as recited in claim 1, wherein the streams of correlated data are stored at a data repository.

4. The method as recited in claim 1, wherein the correlated streams are received over a wireless Internet communications link.

5. A method in a data processing system for analysis of data generated by a plurality of vehicles in a fleet, wherein each of the vehicles is equipped with an onboard diagnostic device and a global positioning system, comprising the steps of:

receiving multiple streams of correlated data, each stream from one of the plurality of vehicles and containing correlated diagnostic and position data in a time stamped format; and analyzing the correlated diagnostic and position data over time to identify a given maintenance problem, wherein the identified maintenance problem is a given vehicle-driver combination that, for a given vehicle, results in increased maintenance costs for the vehicle over a given period of time.

6. A method in a data processing system for analysis of data generated by a plurality of vehicles in a fleet, wherein each of the vehicles is equipped with an onboard diagnostic device and a global positioning system, comprising the steps of:

receiving multiple streams of correlated data, each stream from one of the plurality of vehicles and containing correlated diagnostic and position data in a time stamped format;

analyzing the correlated diagnostic and position data over a given time period to identify a given vehicle route that is associated with increased maintenance costs; and assigning given vehicles an alternate route to avoid the given vehicle route.

7. A computer program product in a computer-readable medium for analysis of data generated by a plurality of vehicles in a fleet, wherein each of the vehicles is equipped with an onboard diagnostic device and a global positioning system, comprising:

means for receiving and storing multiple streams of correlated data, each stream from one of the plurality of vehicles and containing correlated diagnostic and position data in a time stamped format;

means for analyzing the correlated data to identify a given maintenance problem, wherein the identified maintenance problem is at least one of a vehicle route, a given driver, and a vehicle route-driver combination that, for a given vehicle, results in increased maintenance costs for the vehicle over a given time period; and means for taking an action to resolve the identified maintenance problem, wherein the action comprises at least one of assigning a given vehicle an alternate route to avoid the vehicle route, assigning a new driver to the given vehicle to avoid the vehicle-driver combination, and scheduling preventive maintenance for vehicles that use the vehicle route.

8. The computer program product as described in claim 7 wherein the analyzing means includes means for identifying a vehicle having a given operating condition.

9. The computer program product as described in claim 7 wherein the analyzing means includes means for identifying which routes force vehicles to exhibit out of specification operation.

10. A computer program in a computer-readable medium for analysis of data generated by a plurality of vehicles in a fleet, wherein each of the vehicles is equipped with an onboard diagnostic device and a global positioning system, comprising:

means for receiving and storing multiple streams of correlated data, each stream from one of the plurality of vehicle and containing correlated diagnostic and position data in a time stamped format; and means for analyzing the correlated data to identify a given maintenance problem wherein the analyzing means includes means for identifying vehicle/driver combinations that result in increased maintenance costs.

11. A server, comprising:

a data repository;

means for receiving and storing in the data repository multiple data records of correlated data, each data record from one of a plurality of vehicles and containing correlated diagnostic and position data in a time stamped format; and means for analyzing the correlated data to identify a given maintenance problem, wherein the identified maintenance problem is at lest one of a vehicle route, a given driver, and a vehicle route-driver combination that, for a given vehicle, results in increased maintenance costs for the vehicle over a given time period; and means for taking an action to resolve the identified maintenance problem, wherein the action comprises at least one of assigning a given vehicle an alternate route to avoid the vehicle route, assigning a new driver to the given beguile to avoid the vehicle-driver combination, and scheduling preventive maintenance foe vehicles that use the vehicle route.

12. A system for analysis of data generated by a plurality of vehicles in a fleet, wherein each of the vehicles is equipped with an onboard diagnostic device and a global positioning system, comprising:

receiving means for receiving multiple streams of correlated data, each stream form on of the plurality of vehicles and containing correlated diagnostic and position data in a time stamped format;

analyzing means for analyzing the correlated data to identify a given maintenance problem, wherein the identified maintenance problem is at least one of a vehicle route, a given driver, and a vehicle route-driver combination that, for a given vehicle, results in increased maintenance costs for the vehicle over a given time period; and resolution means for taking an action to resolve the identified maintenance problem, wherein the action comprises at least one of assigning a given vehicle an alternate route to avoid the vehicle route, assigning a new driver to the given vehicle to avoid the vehicle-driver combination, and scheduling preventive maintenance for vehicles that use the vehicle route.

13. The system as recited in claim 12 wherein the correlated data is analyzed over a given time period to identify given vehicles in the fleet that exhibit out of specification operation.

14. The system as recited in claim 12, wherein the streams of correlated data are stored at a data repository.

15. The system as recited in claim 12, wherein the correlated streams are received over a wireless Internet communications link.

16. A computer program product in a computer-readable medium for analysis of data generated by a plurality of vehicles in a fleet, wherein each of the vehicles is equipped with an onboard diagnostic device and a global positioning system, comprising:

means for receiving multiple streams of correlated data, each stream from one of the plurality of vehicles and containing correlated diagnostic and position data in a time stamped format;

means for analyzing the correlated data over a given time period to identify a given vehicle route that is associated with increased maintenance costs; and means for assigning a given vehicle an alternate route to avoid the given vehicle route.

* * * * *

UNITED STATES PATENT AND TRADEMARK OFFICE
CERTIFICATE OF CORRECTION

PATENT NO. : 6,505,106 B1  Page 1 of 1
DATED : January 7, 2003
INVENTOR(S) : Lawrence et al.

It is certified that error appears in the above-identified patent and that said Letters Patent is hereby corrected as shown below:

Column 10,
Line 37, after "at", please delete "lest" and insert -- least --.
Line 45, after "given", please delete "beguile" and insert -- vehicle --.
Line 46, after "maintenance", please delete "foe" and insert -- for --.
Line 53, after "stream", please delete "form on" and insert -- from one --.

Signed and Sealed this

Thirteenth Day of May, 2003

JAMES E. ROGAN
*Director of the United States Patent and Trademark Office*